(12) United States Patent
Ueno

(10) Patent No.: US 6,625,419 B2
(45) Date of Patent: Sep. 23, 2003

(54) GRADING SYSTEM, SERVER COMPUTER, CARD CASE, AND CARD

(75) Inventor: Takashi Ueno, Sumida-ku (JP)

(73) Assignee: R & B 21, Tokyo (JP)

( * ) Notice: Subject to any disclaimer, the term of this patent is extended or adjusted under 35 U.S.C. 154(b) by 0 days.

(21) Appl. No.: 09/862,482

(22) Filed: May 23, 2001

(65) Prior Publication Data

US 2002/0076685 A1 Jun. 20, 2002

(30) Foreign Application Priority Data

Dec. 15, 2000 (JP) ........................................ 2000-381531

(51) Int. Cl.[7] .......................... B42D 15/00; G06F 17/60
(52) U.S. Cl. .......................................... 434/350; 705/51
(58) Field of Search ................................. 434/350, 352, 434/353, 362, 363; 705/51, 41, 26, 10; 713/159, 200, 155

(56) References Cited

U.S. PATENT DOCUMENTS

| 4,852,736 | A | * | 8/1989 | Kojima et al. ................. 29/830 |
| D346,829 | S | | 5/1994 | Keefe |
| D377,420 | S | | 1/1997 | Slyh et al. |
| 5,745,884 | A | * | 4/1998 | Carnegie et al. ............... 705/34 |
| 5,794,207 | A | | 8/1998 | Walker et al. |
| 5,948,991 | A | * | 9/1999 | Nomura et al. ................. 73/727 |
| 6,076,164 | A | * | 6/2000 | Tanaka et al. ............... 713/185 |
| 6,105,132 | A | * | 8/2000 | Fritch et al. ................. 713/167 |
| 6,359,699 | B1 | * | 3/2002 | Yoneta et al. ............... 358/1.16 |
| 2002/0032858 | A1 | * | 3/2002 | Nakano et al. ............. 713/159 |
| 2002/0049677 | A1 | * | 4/2002 | Yamada et al. ................ 705/51 |

FOREIGN PATENT DOCUMENTS

| GB | 2 331 825 A | * | 6/1999 | ............. G06F/1/00 |
| JP | 2000-284678 | * | 10/2000 | ............ G09B/7/02 |

* cited by examiner

Primary Examiner—Hieu T. Vo
(74) Attorney, Agent, or Firm—Oblon, Spivak, McClelland, Maier & Neustadt, P.C.

(57) ABSTRACT

A grading system includes a sever computer installed in a management company and a client computer owned by a client and connected to the server computer via a network. Through use of the client computer, a client requests the sever computer to appraise and register a card. The management company appraises the card received from the client and stores an appraisal result and information regarding the client in an IC chip as card information. Subsequently, the management company returns the card and the IC chip to the client.

21 Claims, 7 Drawing Sheets

GRADING SYSTEM, SERVER COMPUTER, CARD CASE, AND CARD

BACKGROUND OF THE INVENTION

1. Field of the Invention

The present invention relates to a grading system for appraising trading cards via a network such as the Internet, a server computer for managing the grading system, a card case for protecting an appraised card, and a card.

2. Description of the Related Art

Recently, not only card collectors in Japan but also card collectors in other countries throughout the world have exchanged, sold, and purchased trading cards among themselves.

A trading card (hereinafter simply referred to as a "card") is a card on which a photograph of a professional athlete or a character of an animated program is printed. In particular, a rare card is traded at a high price.

With a trend toward global trading of cards, the distance between parties who trade or exchange a card has increased, making direct checking of the conditions of the card difficult.

Moreover, due to recent progress of, for example, the Internet technique, cards are sometimes sold at an auction. However, buyers encounter difficulty in grasping the conditions of a card.

SUMMARY OF THE INVENTION

In view of the foregoing, an object of the present invention is to provide a grading system which enables card collectors to trade and exchange cards without anxiety.

Another object of the present invention is to provide a server computer, a card case, and a card that can be used in the grading system.

In order to achieve the above objects, according to a first aspect of the present invention, there is provided a grading system, comprising a server computer connected to a network; and a client computer connected to the network and provided on the side of an owner of a card, wherein the server computer includes storage means for storing an appraisal result of the card and owner information of the card input from the client computer, and when the ownership of the card is changed, the storage means updates and stores the owner information of the card.

In the grading system of the first aspect, the server computer holds an appraisal result of a card and owner information input from the client computer owned by the owner of the card; and when the ownership of the card is changed, the owner information is updated.

According to a second aspect of the present invention, there is provided a grading system, comprising a server computer connected to a network; a first client computer connected to the network and provided on the side of an owner of a card; and a second client computer connected to the network and provided on the side of a potential buyer of the card, wherein the server computer includes storage means for storing an appraisal result of the card and owner information of the card input from the first client computer, and information provision means for providing the second client computer with the appraisal result and the owner information of the card stored in the storage means.

In the grading system of the second aspect, the server computer holds an appraisal result of a card and owner information input from the first client computer owned by the owner of the card; and the appraisal result and the owner information of the card are provided to the second client computer owned by the potential buyer of the card.

The potential buyer can purchase the card without anxiety, because he or she can know the appraisal result and the owner information of the card.

According to a third aspect of the present invention, there is provided a server computer, comprising storage means for storing an appraisal result of a card and owner information of the card, wherein when the ownership of the card is changed, the storage means updates and stores the owner information of the card.

The server computer of the third aspect is characterized in that the server computer holds an appraisal result of a card and owner information of the card; and when the ownership of the card is changed, the server computer updates the owner information.

According to a fourth aspect of the present invention, there is provided a card case comprising a body case having a card accommodation space for accommodating a card, and an IC chip accommodation space for accommodating an IC chip; and a lid covering the body case.

The card case of the fourth aspect protects a card and an IC chip in which are stored an appraisal result and owner information of the card.

That is, the appraisal result of the card and the history of ownership of the card can be found through an operation of reading data stored in the IC chip.

According to a fifth aspect of the present invention, there is provided a card case comprising a body case having a card accommodation space for accommodating a card, and an IC chip accommodation space for accommodating an IC chip; a lid provided on the body case so as to cover the body case; and a cover provided on the lid so as to cover the lid.

The card case of the fifth aspect is characterized by provision of a cover for protecting a signing portion provided on the lid of the card case.

According to a sixth aspect of the present invention, there is provided a card comprising an IC chip for storing appraisal information of the card.

The card of the sixth aspect includes an IC chip, and appraisal information of the card and other data are stored in the IC chip. Therefore, the appraisal information of the card can be obtained through an operation of reading the IC chip.

According to a seventh aspect of the present invention, there is provided a card comprising an IC chip for storing owner information of the card.

The card of the seventh aspect includes an IC chip, and owner information of the card and other data are stored in the IC chip. The owner information includes information regarding a history of ownership.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENT

Figure 1:
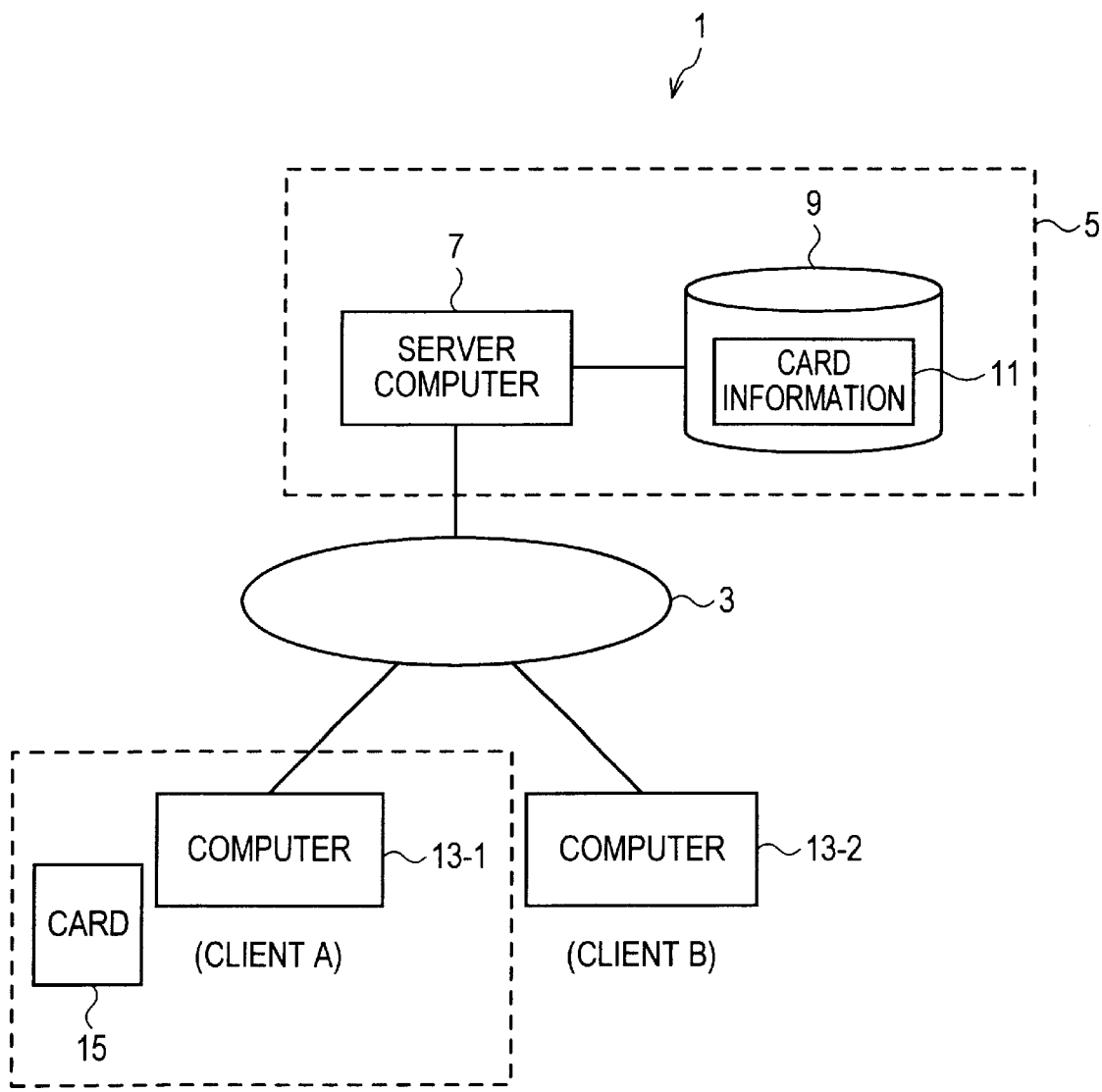
FIG. 1 is a block diagram schematically showing the configuration of a grading system according to an embodiment of the present invention.

An embodiment of the present invention will now be described in detail with reference to the drawings. FIG. 1 is a block diagram schematically showing the configuration of a grading system 1 according to an embodiment of the present invention.

Here, the term "grading" means appraising a card.

The grading system 1 includes a network 3, a server computer 7, a client computer 13-1, and a client computer 13-2.

The network 3 is the Internet or any other suitable communication network.

The server computer 7 is connected to the network 3 and is disposed in a management company 5. The management company 5 performs card appraisal, among other functions. The server computer 7 has a database 9 for holding card information 11. The card information 11 includes, for each card, a card type, information regarding the owner of the card, and an appraisal result of the card.

The client computer 13-1 is owned by a client A and is connected to the network 3. The client computer 13-2 is owned by a client B and is connected to the network 3.

Here, we assume that the client A owns a card 15 and requests the management company 5 to appraise the card 15. The processing for appraising the card 15 will be described below.

The management company 5 receives the card 15 from the client A and appraises the card 15. The management company 5 appraises the card 15 by means of evaluating four items; i.e., center, corners, edges, and surface. Specifically, the management company 5 evaluates each item, determines an evaluation point of each item, and determines an overall evaluation point. This appraisal is performed by use of a special testing device (not shown).

Figure 2:
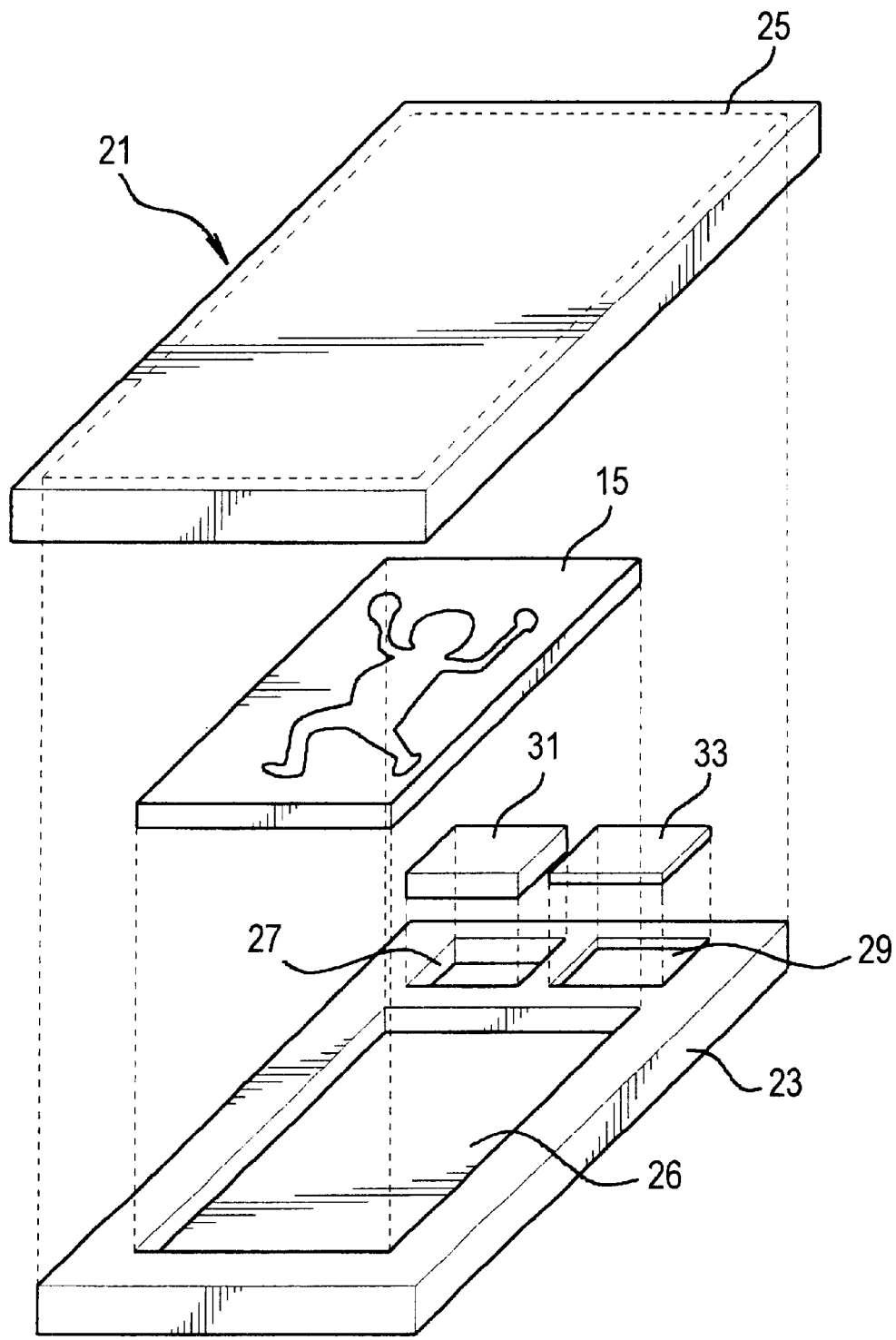
FIG. 2 is an exploded perspective view of a card case.

The appraised card 15 is accommodated in a card case 21. FIG. 2 shows the structure of the card case 21. The card case 21 consists of a case body 23 and a lid 25.

The case body 23 assumes a plate-like shape, and formed on the case body 23 are a card accommodation portion 26, an IC chip accommodation portion 27, and a seal accommodation portion 29, each assuming the form of a rectangular depression. The card IC 15 is accommodated in the card accommodation portion 26. An IC chip 31 is accommodated in the IC chip accommodation portion 27. A seal 33 is accommodated in the seal accommodation portion 29.

Figure 3:
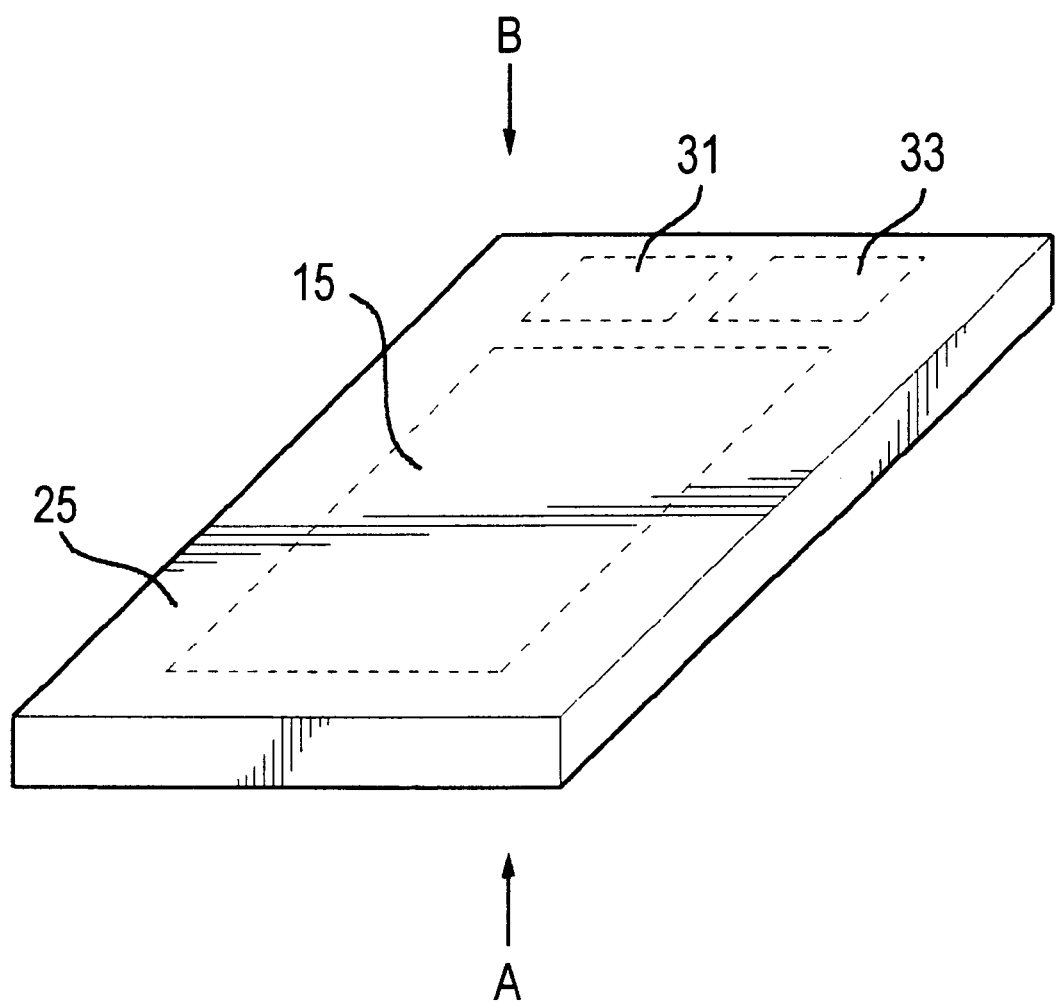
FIG. 3 is a perspective view of the card case in which a body case and a lid are assembled closely.

FIG. 3 shows the card case 21 in which the case body 23 and the lid 25 are joined closely. The card IC 15 is accommodated in the card accommodation portion 26. The IC chip 31 is accommodated in the IC chip accommodation portion 27. The seal 33 is accommodated in the seal accommodation portion 29. Subsequently, the lid 25 is placed on the case body 23. By use of a special apparatus (not shown), the case body 23 and the lid 25 are completely welded together by means of ultrasonic waves so as to protect the card 15, the IC chip 31, etc.

The case body 23 and the lid 25 are formed of a transparent, hard material, such as acrylic plate, so that the card 15, the IC chip 31, and the seal 33 can be viewed from the upper side (along direction B in FIG. 3) and from the lower side (along direction A) of the card case 21.

Figure 4:
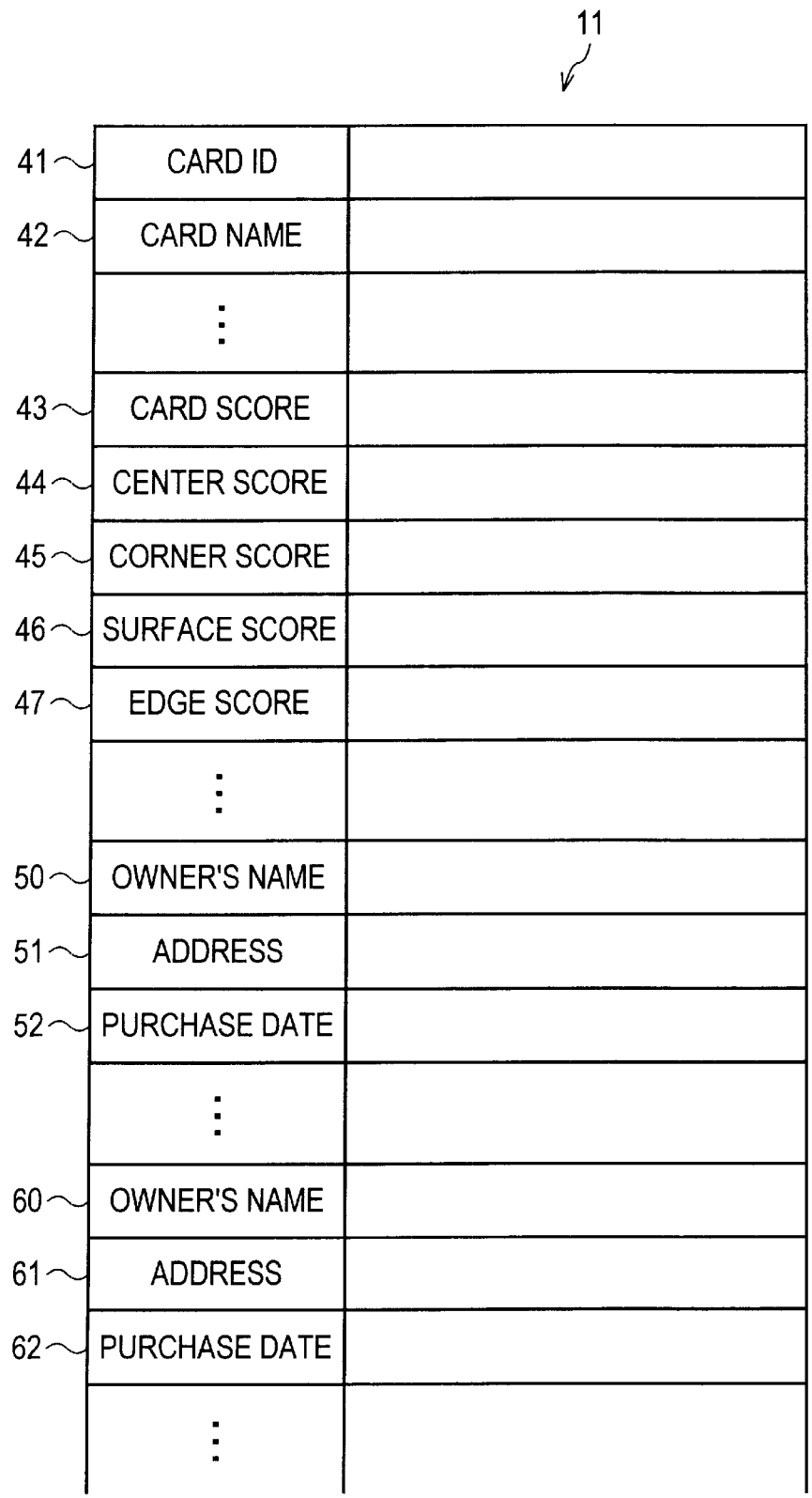
FIG. 4 is a table showing card information.

The card information 11 of the card 15 and other data are stored in the IC chip 31. FIG. 4 shows the card information 11. The card information 11 includes a card ID 41, a card name 42, a card score 43, a center score 44, a corner score 45, an edge score 46, a surface score 47, an owner's name 50, an address 51, a purchase date 52, another owner's name 60, another address 61, another purchase date 62, etc.

The card ID 41, the card name 42, etc., are items for representing a card type. The card ID 41 is an identification number of the card 15. The card name 42 is the name of, for example, a professional athlete whose picture is printed on the card 15.

The card score 43, the center score 44, the corner score 45, the edge score 46, the surface score 47, etc. are items regarding the appraisal result of the card 15. The center score 44 represents an evaluation point regarding a center portion of the card 15; the corner score 45 represents an evaluation point regarding corners of the card 15, the edge score 46 represents an evaluation point regarding edges of the card 15, the surface score 47 represents an evaluation point regarding surfaces of the card 15; and the card score 43 represents an overall evaluation point of the card 15.

The owner's name 50, the address 51, the purchase date 52, etc. and the owner's name 60, the address 61, the purchase date 62, etc. are information items regarding the past and present owners of the card 15. For example, the information regarding the client A, who is the present owner, is stored in the rows corresponding to the owner's name 50, the address 51, the purchase date 52, etc.; and the information regarding a person who owned the card 15 previous to the client A is stored in the rows corresponding to the owner's name 60, the address 61, the purchase date 62, etc.

As described above, the card information 11 is stored in the IC chip 31. In other words, through reading the IC chip 31, the card type, the appraisal result of the card, and the history of ownership can be obtained.

Further, it is possible to store in the IC chip 31 the voice and a motion picture of, for example, an athlete whose picture is printed on the card 15.

Information necessary for checking the card 15, such as the card type and evaluation points representing the appraisal result, is described on the seal 33. The seal 33 may be omitted if the client A so wishes.

When the card case 21 is used, the card 15 and the IC chip 31 can be protected from damage, and undesired actions such as removing the IC chip 31 or the seal 33 and copying or overwriting the information can be prevented.

Next, appraising and trading processing performed by the present system will be described.

Figure 5:
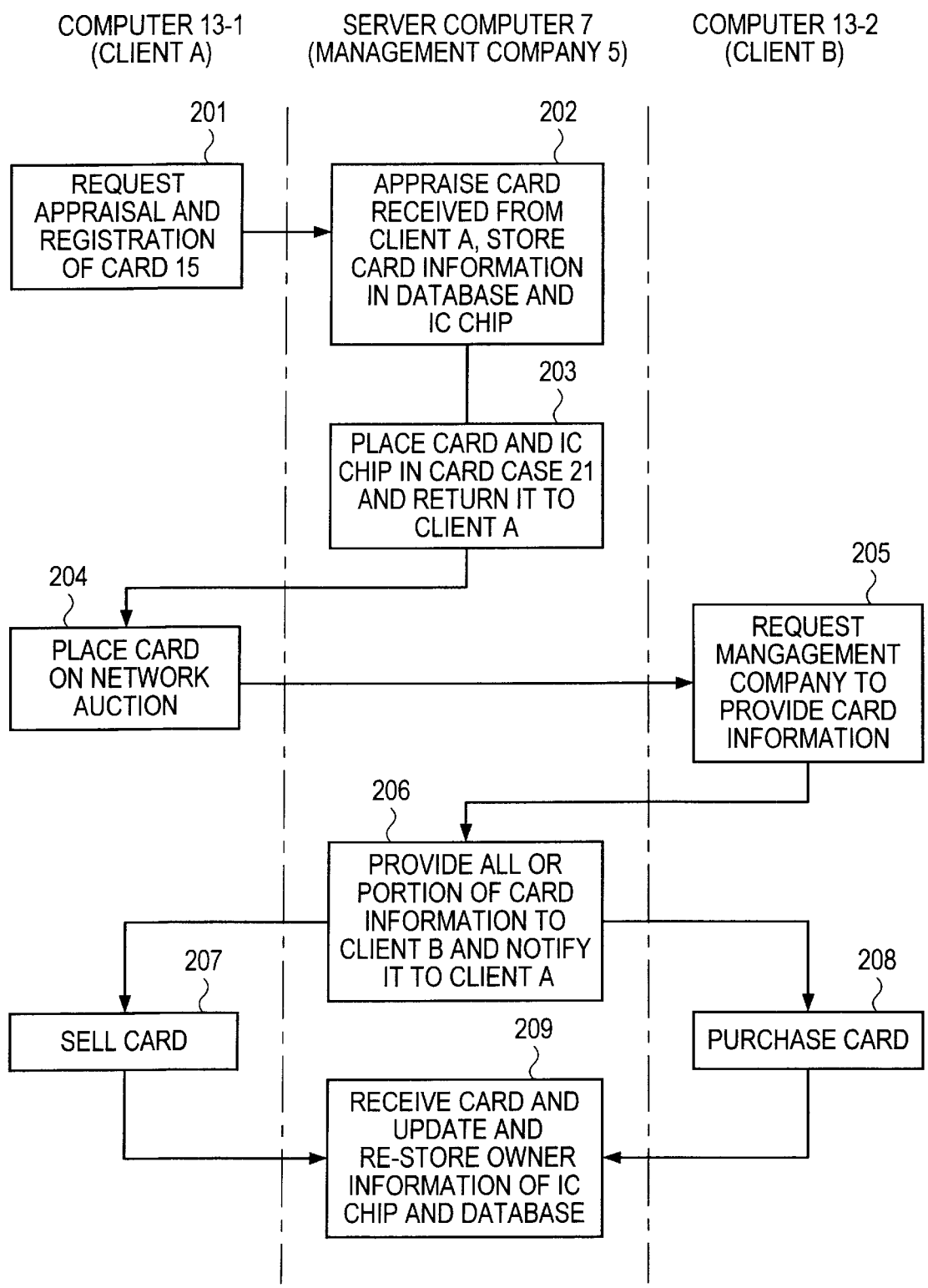
FIG. 5 is a flowchart showing card appraising/trading processing performed by the grading system.

FIG. 5 is a flowchart showing card appraising/trading processing performed by the grading system 1. The client A requests the managing company 5 to appraise and register the card 15 (step 201).

At this time, by use of the client computer 13-1, the client A requests the appraisal of the card 15 while providing personal information, such as name, address, and mailing address, to the server computer 7 via the network 3. Moreover, the client A mails the card 15 to the management company 5 or carries the card 15 to the management company 5.

The management company 5 appraises the card 15 received from the client A, by use of an appraisal apparatus or any other suitable apparatus, and stores the card information 11 in the database 9 and the IC chip 31 (step 202). That is, the server computer 7 stores in the database 9 and the IC chip 31, as the card information 11, the above-described card type of the card 15, the personal information (owner information) of the card 15, and the appraisal result of the card 15.

The management company 5 places the card 15, the IC chip 31, etc. in the card case 21 and returns them to the client A (step 203).

Subsequently, the client A—who wishes to sell the card 15—places the card 15 on an auction on the network 3 by use of the client computer 13-1 (step 204). At this time, the client A reports that the card 15 has been appraised by the management company 5.

Here, we assume that the client B has found the card 15 placed on the auction over the network 3 and informs the management company 5 by use of the client computer 13-2 that the client B wishes to buy the card 15. In this case, from the client computer 13-2, the client B requests the server computer 7 of the management company 5 to provide the card information 11 regarding the card 15 (step 205). At this time, the client B provides his/her personal information, such as name, address, mailing address, to the server computer 7.

The server computer 7 provides the client computer 13-2 of the client B with a portion or the entirety of the card information 11 of the card 15. Simultaneously, the server computer 7 provides the client computer 13-1 of the client A with the contents of the card information 11 provided to the client B and the personal information of the client B (step 206).

On the basis of the information provided from the server computer 7, the clients A and B exchange information regarding trading (sales and purchase) of the card 15. When trade negotiations have been completed successfully, the client A sells the card 15 (step 207), and the client B purchases the card 15 (step 208).

Specifically, the client A sells the card 15 to the client B, and the client B pays money to the client A. The management company 5 receives the card case 21 from the client A, and updates and re-stores the owner information of the IC chip 31 and the database 9 (step 209). Subsequently, the management company 5 mails the card case 21 to the client B. The management company 5 updates the card information 11 stored in the IC chip 31 and the database 9 in order to store the information that the owner of the card 15 is changed from the client A to the client B.

Notably, the client A pays the management company 5 fees arising from appraisal of the card 15, storage of the card information, and provision of the card case 21.

The client B pays to the management company 5 fees arising from provision of information regarding the card 15, and pays to the client A money for the card 15.

Moreover, the clients A and B pay brokerage commissions to the management company 5, who serves as a broker in the card trading.

In the processing shown in FIG. 2, the client A places the card 15 on the network auction by him/herself. However, the client A may request the management company 5 to perform a sales transaction. In such a case, the management company 5 invites potential buyers, by posting information regarding sales of the card 15 on an Internet homepage of the company.

As described above, the grading system 1 appraises the card 15 to thereby guarantee the value of the card 15. Therefore, the clients A and B can sell and buy the card 15 without any anxiety.

Further, since the card 15 is placed in the card case 21, the card 15 is protected from damage. In addition, since card information is held in the IC chip, the owner of the card 15 can hold the card 15 safely together with information which he or she does not wish other persons to know.

The IC chip 31 may be incorporated in the card 15. As described above, card information 11 is stored in the IC chip 31 and is updated when the ownership of the card 15 changes.

Figure 6:
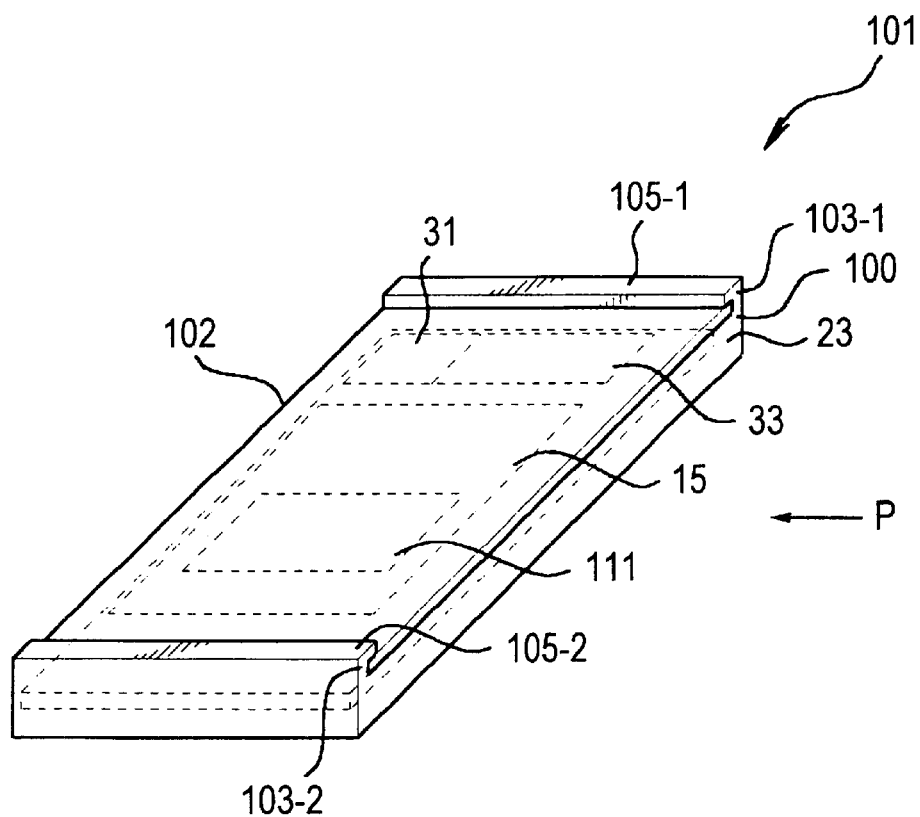
FIG. 6 is a perspective view of another card case.
Figure 7:
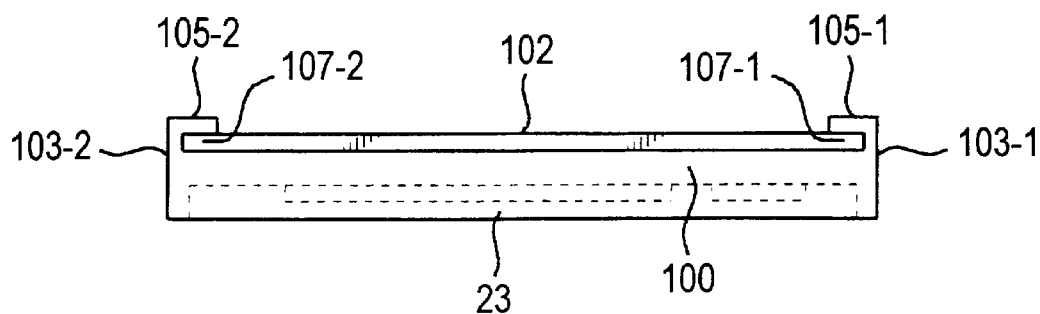
FIG. 7 is a view along direction P in FIG. 6.
Figure 8:
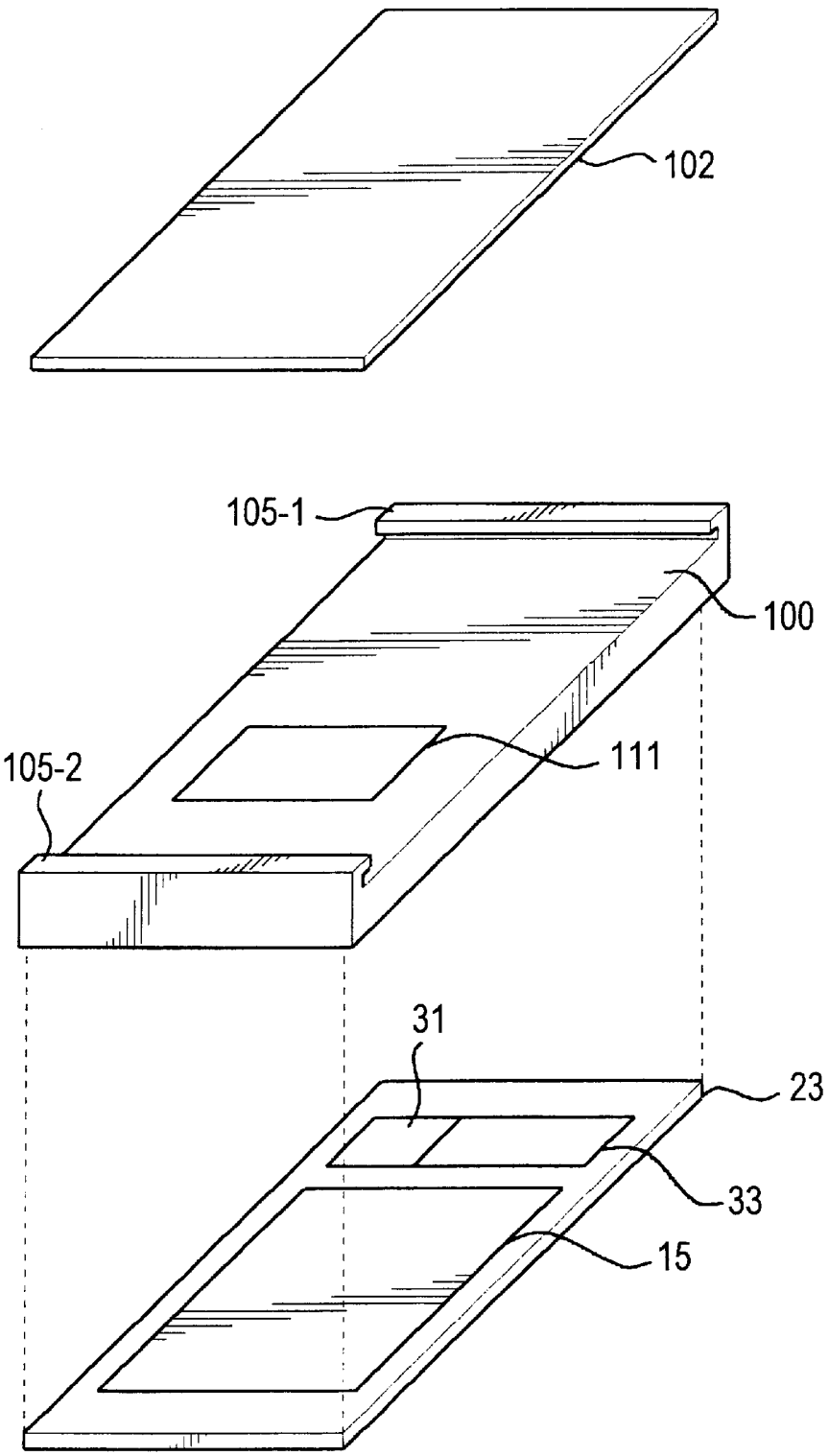
FIG. 8 is an exploded perspective view of the card case of FIG. 6, showing respective portions of the card case.

Next, another example of the card case will be described. FIG. 6 is a perspective view of a card case 101; and FIG. 7 is a view of the card case 101 along direction P in FIG. 6. FIG. 8 is an exploded perspective view showing respective portions of the card case 101.

The card case 101 consists of a case body 23, a lid 100, and a cover 102. The case body 23 has the same structure as that of the card case 21 shown in FIG. 2.

As shown in FIG. 8, in some cases a signing portion 111 may be provided on the top face of the lid 100. The signing portion 111 is a place where the athlete whose picture is printed on the card is to sign his or her autograph upon request. The signing portion 111 is surface-treated in order to facilitate signing.

As shown in FIGS. 6 and 7, holder support portions 103-1 and 103-2 are provided at opposite ends of the lid 100. The holder support portions 103-1 and 103-2 support corresponding holding portions 105-1 and 105-2. The holding portions 105-1 and 105-2 project inward from the holder support portions 103-1 and 103-2.

As shown in FIG. 7, the holder support portions 103-1 and 103-2 and the holding portions 105-1 and 105-2 form grooves 107-1 and 107-2 in cooperation with the lid 100. When opposite ends of the cover 102 are fitted into the grooves 107-1 and 107-2, the cover 102 comes into close contact with the lid 100. The cover 102 protects the signing portion 111 provided on the lid 100. The cover 102 may be formed of a thin film.

In this manner, as shown in FIGS. 6 and 7, the case body 23, the lid 100, and the cover 102 are assembled closely.

Since the cover 102 is provided above the signing portion 111, direct contact between a hand and the signing portion 111 is avoided, and adhesion of dirt or the like to an autograph signed on the signing portion 111 can be prevented.

The card case 101 may be modified as follows. Holder support portions 103 and holding portions 105 are provided along the four sides of the lid 100; and the cover 102 is fitted into grooves formed thereby, in such a manner that the cover 102 comes into close contact with the top face of the lid 100.

Moreover, instead of providing the holder support portions 103 and the holding portions 105, the cover 102 may be bonded or welded to the top face of the lid 100.

As described above, the grading system of the present invention enables card collectors to trade cards safely; and the card case of the present invention protects a card and the information regarding the card.

Obviously, numerous modifications and variations of the present invention are possible in light of the above teachings. It is therefore to be understood that within the scope of the appended claims, the present invention may be practiced otherwise than as specifically described herein.

What is claimed is:

1. A grading system, comprising:
a server computer connected to a network; and
a client computer connected to the network and provided on the side of an owner of a card, wherein
the server computer includes storage means for storing an appraisal result of the card and owner information of the card input from the client computer, and
when the ownership of the card is changed, the storage means updates and stores the owner information of the card.

2. A grading system, comprising:
a server computer connected to a network;
a first client computer connected to the network and provided on the side of an owner of a card; and
a second client computer connected to the network and provided on the side of a potential buyer of the card, wherein
the server computer includes storage means for storing an appraisal result of the card and owner information of the card input from the first client computer, and information provision means for providing the second client computer with the appraisal result and the owner information of the card stored in the storage means.

3. A server computer, comprising:
storage means for storing an appraisal result of a card and owner information of the card, wherein
when the ownership of the card is changed, the storage means updates and stores the owner information of the card.

4. A server computer according to claim 3, further comprising information provision means for providing the appraisal result and the owner information to a client computer owned by a potential buyer of the card and connected to the server computer via a network.

5. A grading system, comprising:
a server computer connected to a network; and
a client computer connected to the network and provided on the side of an owner of a card, wherein
the server computer stores an appraisal result of the card and owner information of the card input from the client computer, and
when the ownership of the card is changed, the server computer updates and stores the owner information of the card.

6. A grading system, comprising:
a server computer connected to a network;
a first client computer connected to the network and provided on the side of an owner of a card; and
a second client computer connected to the network and provided on the side of a potential buyer of the card, wherein
the server computer stores an appraisal result of the card and owner information of the card input from the first client computer, and provides the second client computer with the stored appraisal result and owner information of the card.

7. A server computer capable of storing an appraisal result of a card and owner information of the card, and updating and storing the owner information of the card when the ownership of the card is changed.

8. A server computer according to claim 7, wherein the server computer provides the appraisal result and the owner information to a client computer connected to the server computer via a network and owned by a potential buyer of the card.

9. A card case, comprising:
a plate-shaped body case having a card accommodation space for accommodating a card on the body case, and an IC chip accommodation space for accommodating an IC chip on the body case, the card accommodation space and the IC chip accommodation space being formed as a rectangular depression; and
a lid covering the body case.

10. A card case, comprising:
a plate-shaped body case having a card accommodation space for accommodating a card on the body case, and an IC chip accommodation space for accommodating an IC chip on the body case, the card accommodation space and the IC chip accommodation space being formed as a rectangular depression;
a lid provided on the body case so as to cover the body case; and
a cover provided on the lid so as to cover the lid.

11. A card case according to claim 10, wherein the lid has a signing portion.

12. A card case according to claim 9 or 10, wherein appraisal information of the card is stored in the IC chip.

13. A card case according to claim 9 or 10, wherein owner information of the card is stored in the IC chip.

14. A card case according to claim 13, wherein the owner information includes a history of ownership of the card.

15. A card, comprising:
an IC chip for storing appraisal information of the card, the appraisal information including items regarding an appraisal result of the card.

16. A card, comprising:
an IC chip for storing owner information of the card, the owner information including items regarding an owner of the card.

17. A card according to claim 16, wherein the owner information includes a history of ownership of the card.

18. A card, comprising:
an IC chip for storing at least one of image information and audio information.

19. A card according to claim 18, wherein appraisal information of the card is stored in the IC chip.

20. A card according to claim 18 or 19, wherein owner information of the card is stored in the IC chip.

21. A card according to claim 20, wherein the owner information includes a history of ownership of the card.

* * * * *